(12) United States Patent
Holz

(10) Patent No.: US 12,285,875 B2
(45) Date of Patent: Apr. 29, 2025

(54) OPTIMIZING CALIBRATION WITH CONSTRAINTS BETWEEN DIFFERENT COORDINATE FRAMES

(71) Applicant: Intrinsic Innovation LLC, Mountain View, CA (US)

(72) Inventor: Dirk Holz, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 486 days.

(21) Appl. No.: 17/089,332

(22) Filed: Nov. 4, 2020

(65) Prior Publication Data

US 2022/0134566 A1 May 5, 2022

(51) Int. Cl.
B25J 9/16 (2006.01)

(52) U.S. Cl.
CPC ............. *B25J 9/1692* (2013.01); *B25J 9/163* (2013.01); *B25J 9/1682* (2013.01); *B25J 9/1697* (2013.01)

(58) Field of Classification Search
CPC ........ B25J 9/1692; B25J 9/163; B25J 9/1682; B25J 9/1697
See application file for complete search history.

(56) References Cited

U.S. PATENT DOCUMENTS

| 6,434,265 B1* | 8/2002 | Xiong | G06T 15/506 |
| | | | 382/284 |
| 2011/0280472 A1* | 11/2011 | Wallack | G06T 7/80 |
| | | | 901/14 |
| 2016/0346932 A1 | 12/2016 | Deng et al. | |
| 2017/0094251 A1* | 3/2017 | Wolke | G06T 7/593 |
| 2018/0089831 A1 | 3/2018 | Liu et al. | |
| 2018/0189565 A1 | 7/2018 | Lukierski et al. | |
| 2018/0307941 A1* | 10/2018 | Holz | G06V 30/1988 |

(Continued)

FOREIGN PATENT DOCUMENTS

| CN | 106595474 | 4/2017 |
| JP | 2019155556 | 9/2019 |

OTHER PUBLICATIONS

International Search Report and Written Opinion in International Appln. No. PCT/US2021/055192, dated Feb. 9, 2022, 9 pages.

(Continued)

*Primary Examiner* — Basil T. Jos
*Assistant Examiner* — Elizabeth Rose Neleski
(74) *Attorney, Agent, or Firm* — Fish & Richardson P.C.

(57) ABSTRACT

Methods, systems, and apparatus, including computer programs encoded on computer storage media, for calibrating a robotic workcell. One of the methods includes obtaining an initial model of a workcell having a plurality of calibration entities including a plurality of robots and a plurality of sensors configured to observe movements by one or more calibration entities. executing a calibration program that generates movement data representing movements by the plurality of robots. A plurality of different constraint pairs are generated from sensor data, the constraint pairs specifying a relationship between poses of calibration entities that are observed in different coordinate frames each defined by a calibration entity and is represented in the sensor data. One or more optimization processes are performed on the plurality of different constraint pairs to generate a plurality of calibration values.

22 Claims, 7 Drawing Sheets

(56) References Cited

U.S. PATENT DOCUMENTS

2020/0242396 A1 7/2020 Holz et al.
2023/0377197 A1* 11/2023 Napolskikh ............ G01C 11/06

OTHER PUBLICATIONS

Tabb et al., "Solving the robot-world hand-eye (s) calibration problem with iterative methods," Machine Vision and Applications, Aug. 2017, 28(5):569-90.
Wikipedia.com [online], "Hand Eye Calibration Problem," Sep. 16, 2019, retrieved on Feb. 23, 2021, retrieved from URL<https://en.wikipedia.org/wiki/Hand_eye_calibration problem>, 3 pages.
Decision to Grant a Patent in Japanese Appln. No. 2023-527375, dated May 7, 2024, 6 pages (with English translation).
Extended Search Report in European Appln. 21889815.3, dated Sep. 11, 2024, 11 pages.
Shiu et al., "Calibration of Wrist-Mounted Robotic Sensors by Solving Homogeneous Transform Equations the Form A X = X B," IEEE Transactions On Robotics and Automation, Feb. 1989, 5(1):16-29.

* cited by examiner

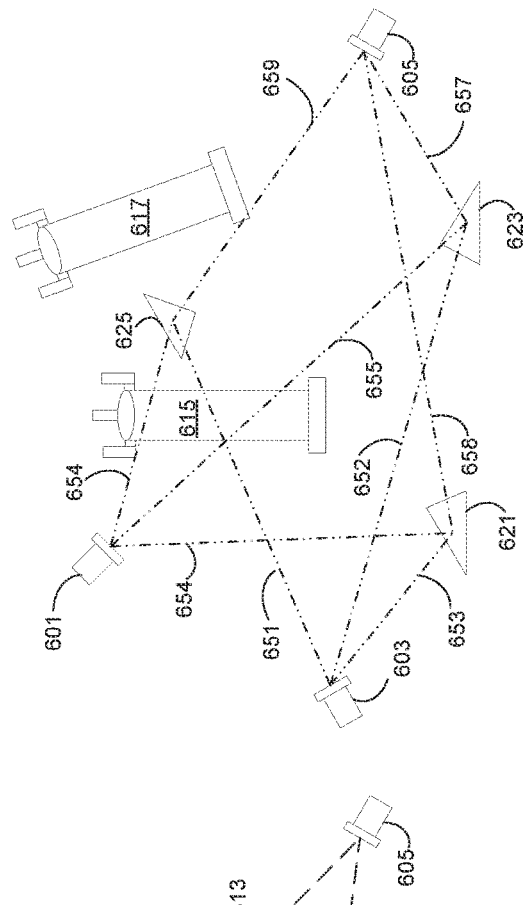
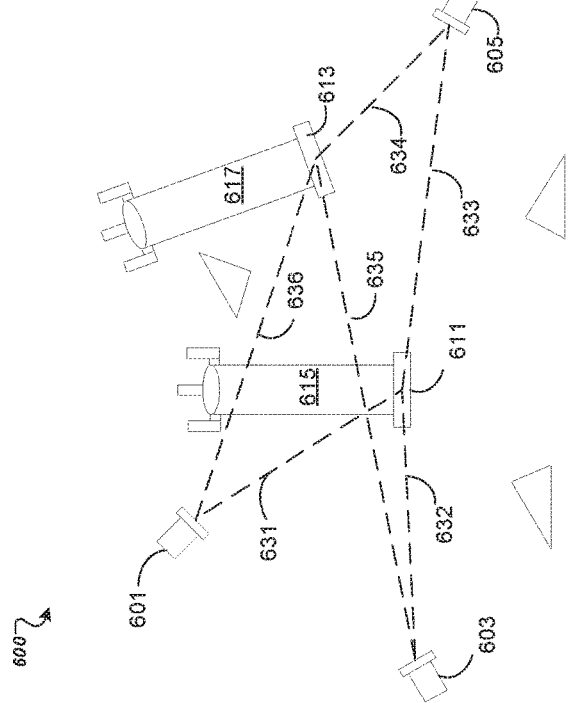
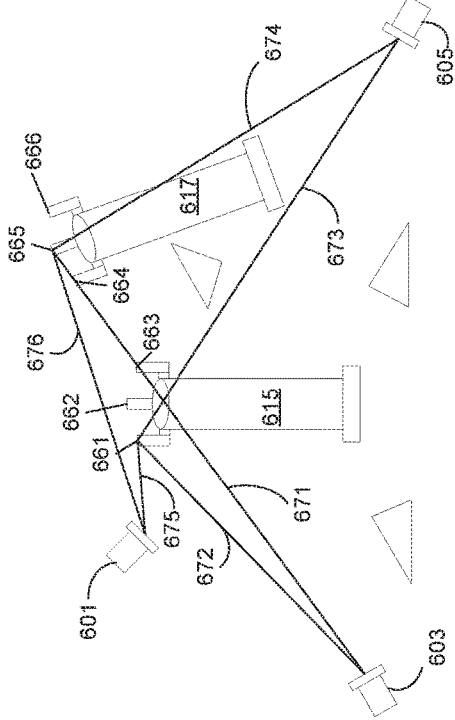
FIG. 6A
FIG. 6B
FIG. 6C

OPTIMIZING CALIBRATION WITH CONSTRAINTS BETWEEN DIFFERENT COORDINATE FRAMES

BACKGROUND

This specification relates to robotics, and more particularly to optimizing calibration of robots and sensors in an operating environment.

In robotics, the physical movements of robots in order to perform tasks are often scheduled by manual pre-programming. For example, a warehouse robot that moves boxes can be programmed to pick up a box at the entrance of a warehouse, move it, and put it down in a target zone of the warehouse. For another example, a construction robot can be programmed to pick up a beam and put it down onto a bridge deck. As each of these actions can include many movements that require high precision, a slight error in measurement of a robot pose or a pose of a detected object can result in failure of the task. Moreover, errors at an early stage in the process can result in accumulated errors in robot movements later in the task, further resulting in failed tasks using a pre-programmed schedule.

Some systems use hand-eye calibrations in an operating environment, e.g., a workcell, to optimize calibration. In hand-eye calibration, a base of a robot can have a pose defined with respect to a sensor's coordinate frame, and the sensor can have its own pose with respect to a reference coordinate frame, and the reference coordinate frame can be pre-determined in a world model or a workcell model.

In an ideal operating scenario, the positions and orientations of each of a plurality of sensors and robots in a workcell are always measured perfectly with respect to the reference coordinate frame, e.g., the coordinate frame of a world model. For example, an ideal scenario would have the plurality of sensors and robots positioned exactly as expected in a CAD model for the workcell upon which a pre-programmed work flow is based.

However, in reality there is often some difference between the actual locations of robots and sensors and the recorded initial positions, which can occur at installation or when the components are calibrated. This can result in errors of disagreement. For example, two cameras can observe the same object as having different positions in the world coordinate frame, which is a particular problem when small distances are important, such as when two components of a workcell should meet. For another example, two closely positioned robots in the real world can appear in slightly different positions in the world coordinate frame when observed through two different sensors with slightly inaccurate pose calibrations. In addition, real poses of robots and sensors can be different from expected poses because robots and sensors can be physically moved while performing task. Thus, one or more current poses of the robots and sensors can deviate from respective expected poses. Calibration errors can also accumulate, particularly when a component, e.g., a tool on a robot, is moved far away from the robot base. Thus it is often challenging to guarantee successful workcell performance due to accumulated errors from miscalibrated components.

SUMMARY

This specification describes how a system can use multiple calibration results and external measurements in multiple different coordinate frames to optimize calibration of components in a robotic operating environment. These techniques provide an automated way to reduce calibration errors for optimizable calibration entities observed in different coordinate frames.

By defining the plurality of different constraint pairs that specify types of poses and relationships between poses measured in different coordinate frames, the system can automatically define a respective local error for each of the plurality of different constraint pairs, and then obtain a plurality of calibration values to compute adjusted poses of each sensor, robot, or other object in the environment, for example, by optimizing a global error that is generated from each local error. This specification describes a number of example constraint pairs that are suitable for performing calibration. In general, each constraint pair includes at least two different coordinate frames, each coordinate frame defining a pose with respect to a reference coordinate frame, e.g., the world coordinate frame. Example constraint pairs include a relative pose constraint, a feature pose constraint, a feature point constraint, in addition to others.

Particular embodiments of the subject matter described in this specification can be implemented so as to realize one or more of the following advantages.

The techniques described below can be used so that the same calibration entity detected by two or more sensors in the environment can be calibrated to appear in substantially the same location with respect to a reference coordinate frame, e.g., the world coordinate frame. As a result, the overall performance of the calibrated work flow for the environment can be substantially improved. The accuracy of the calibration can be improved even without solving for all local errors for the plurality of different constraint pairs. In addition, the number of constraint pairs is flexible and scalable, meaning that constraint pairs can be added or removed depending on local needs without affecting the operation of the calibration techniques.

In addition, the disclosed techniques can combine calibration results of traditional calibrations that calibrate only one optimizable calibration entity with respect to another calibration entity at a time, such that every optimizable calibration entity within the world model can be calibrated with respect to any other calibration entity.

Moreover, the disclosed techniques can identify and quantify inaccurate calibration results by comparing a calibration result of a calibration entity using a constraint pair in the model against other calibration results of the same calibration entity using other constraint pairs, determining if the calibration result is different from other calibration results, and quantifying the difference between the calibration result and other calibration results, for example, using an error function. In response, the system can determine if the calibration result will be taken into consideration for optimization and identify mistakes in the calibration process.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6A illustrates relative pose constraints applied in an example environment.

FIG. 6B illustrates feature pose constraints applied in the example environment of FIG. 6A.

FIG. 6C illustrates feature point constraints applied in the example environment of FIG. 6A.

Like reference numbers and designations in the various drawings indicate like elements.

DETAILED DESCRIPTION

Figure 1:
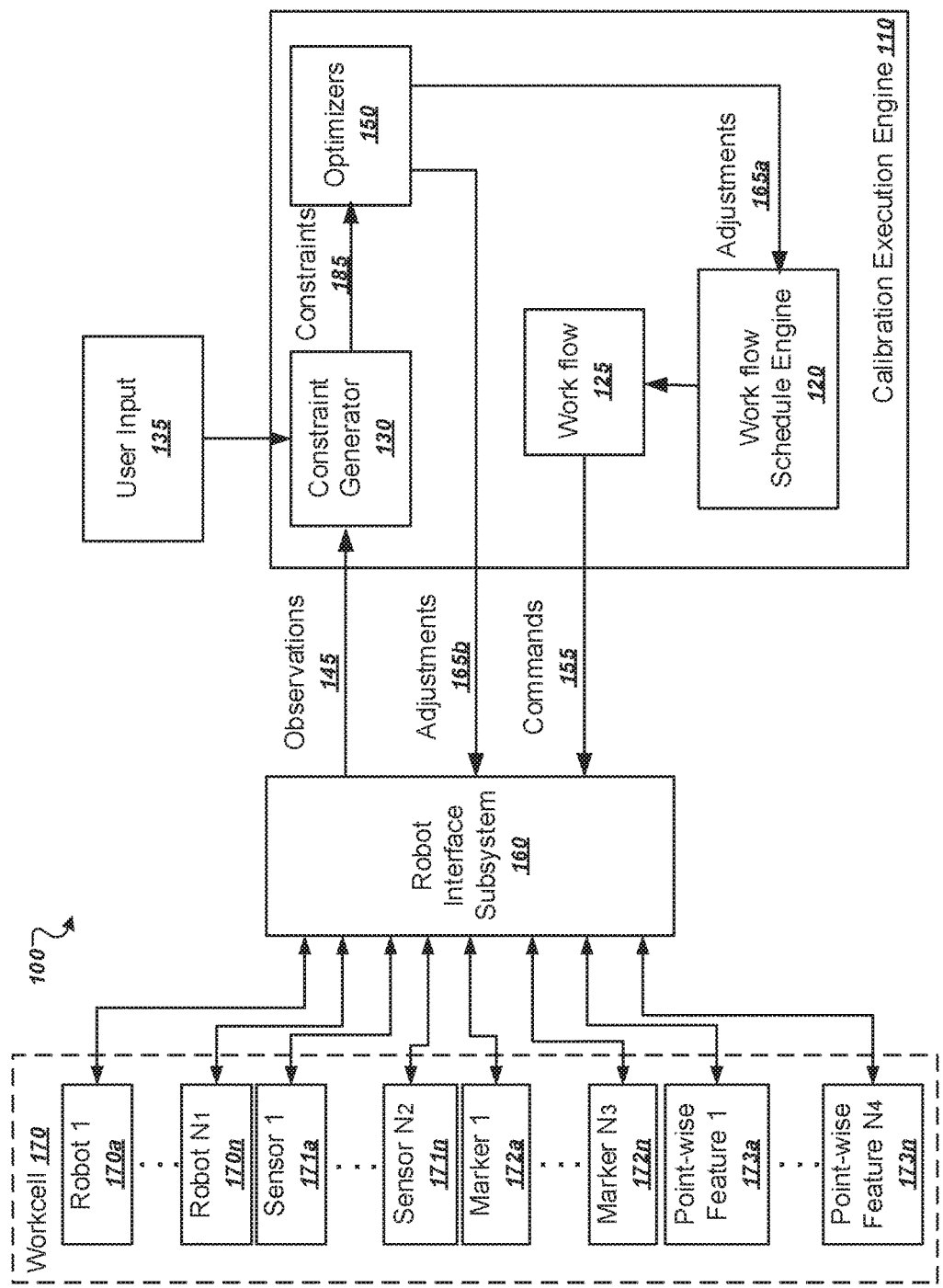
FIG. 1 illustrates an example calibration system to optimize calibrations in an environment.

FIG. 1 illustrates an example calibration system 100 to optimize calibrations in an operating environment. In this example, a robot workcell 170 is used as an example operating environment. The techniques described in this specification can also be used to adjust calibration for other operating environments that are not workcells. The system 100 includes a calibration execution engine 110 and a robot interface subsystem 160. The calibration execution engine 110 includes a constraint generator 130, one or more optimizers 150 and a work flow schedule engine 120. The system 100 can be implemented as computer programs installed on one or more computers in one or more locations that are coupled to each other through any appropriate communications network, e.g., an intranet or the Internet, or combination of networks. The work flow schedule engine 120 is a system comprising one or more computers and one or more storage devices storing instructions that are operable, when executed by the one or more computers, to cause the one or more computers to perform operations of generating and updating a work flow 125 for robots in the workcell 170.

The system 100 can instruct the calibration execution engine 110 to either send adjustments 165b to the robot interface subsystem 160 to calibrate poses of one or more optimizable calibration entities, e.g., robots 170a-n, sensors 171a-n, in the workcell 170, or send commands 155 to the robot interface subsystem 160 to drive one or more optimizable calibration entities in the workcell 170. The commands 155 can be based on a work flow 125 that is generated by the work flow schedule engine 120 by incorporating adjustments 165a obtained by the optimizers 150. As illustrated in FIG. 1, the sensors 171a-n need not have a one-to-one correspondence with robots 170a-n and need not be coupled to the robots or be moveable. In fact, each robot can have multiple sensors, and the sensors can be mounted on stationary or movable surfaces in the workcell 170. Similarly the markers 172a-n and point-wise features 173a-n are not necessarily coupled to robots. However, the point-wise features 173a-n can be some part of the robots 170a-n. The total number of sensors, robots, markers and point-wise features are independent of each other and can be customized according to local site or task requirements.

A calibration entity is an aspect of the workcell that is involved in a calibration process within a world model. A calibration entity can thus be a robot or a part of a robot; an object, e.g., a marker; a point-wise feature or a workpiece that is being worked on by robots; or a sensor in the workcell, to name just a few examples. Each robot can have multiple joints. For example, many industrial robots have six joints with a base. A sensor can be any appropriate sensor for guiding robot actions, e.g., an image sensor such as a camera; a 3D sensor; or a point sensor such as a laser tracker, to name just a few examples.

Typically the calibration entities are optimizable calibration entities, meaning that they can be calibrated relative to the world coordinate frame according to one or more optimization processes. In some implementations, the system 100 can also calibrate the world coordinate frame itself relative to another coordinate frame. As shown in FIG. 1, the workcell 170 includes calibration entities such as one or more robots 170a-n, one or more sensors 171a-n, one or more markers 172a-n and one or more point-wise features 173a-n, wherein optimizable calibration entities include robots 170a-n and 171a-n.

A pose defines a position and an orientation of a calibration entity in an environment. The position of a calibration entity can be expressed using three-dimensional translational degrees of freedom. For example in a Cartesian basis, the position can be the coordinates of the calibration entity projected in x, y, and z axes with respect to a coordinate frame. The orientation of a calibration entity can be expressed using three-dimensional rotational degrees of freedom. For example in the Cartesian basis, the orientation can be Euler angles of the calibration entity along x, y, and z axes with respect to a coordinate frame. In some implementations, the orientation can have four-dimensional degrees of freedom using rotation quaternions. In some cases, the degrees of freedom of a calibration entity can be used to select appropriate sensors. For example, if a pose has both translational and rotational degrees of freedom, image sensors, for example, cameras, can be chosen for the calibration entity. As another example, if a pose has only translational degrees of freedom, point sensors such as laser trackers can be chosen for the calibration entity.

To perform calibration for the workcell 170, the robot interface subsystem 160 can first output observations 145 to the calibration execution engine 110 as input. The observations 145 can include data defining poses of one or more calibration entities in the workcell 170. Next, the constraint generator 130 can take as input the observations 145 and then output constraint pairs 185 based on user input 135 to one or more optimizers 150. The one or more optimizers 150 of the calibration execution engine 110 can output adjustments 165b to the robot interface subsystem 160 to adjust poses of one or more optimizable calibration entities, output adjustments 165a to a work flow obtained by the work flow schedule engine 120 at a previous time step, or both. The work flow schedule engine 120 can incorporate adjustments 165a when updating the work flow 125 and can send commands 155 to the robot interface subsystem 160 to drive robots 170a-n accordingly.

The constraints 185 can include a number of different types of constraints, e.g., a relative pose constraint, a feature pose constraint, a feature point constraint, a distance constraint, a chained constraint, or a combined constraint, to name just a few examples. Each of the types of constraints includes at least a pair of optimizable calibration entities, and thus, they can also be referred to as constraint pairs.

The details of constraint types, the system 100 generating constraint pairs for the workcell 170 and the system 100 optimizing the calibration process will be discussed in more detail below.

Figure 2A:
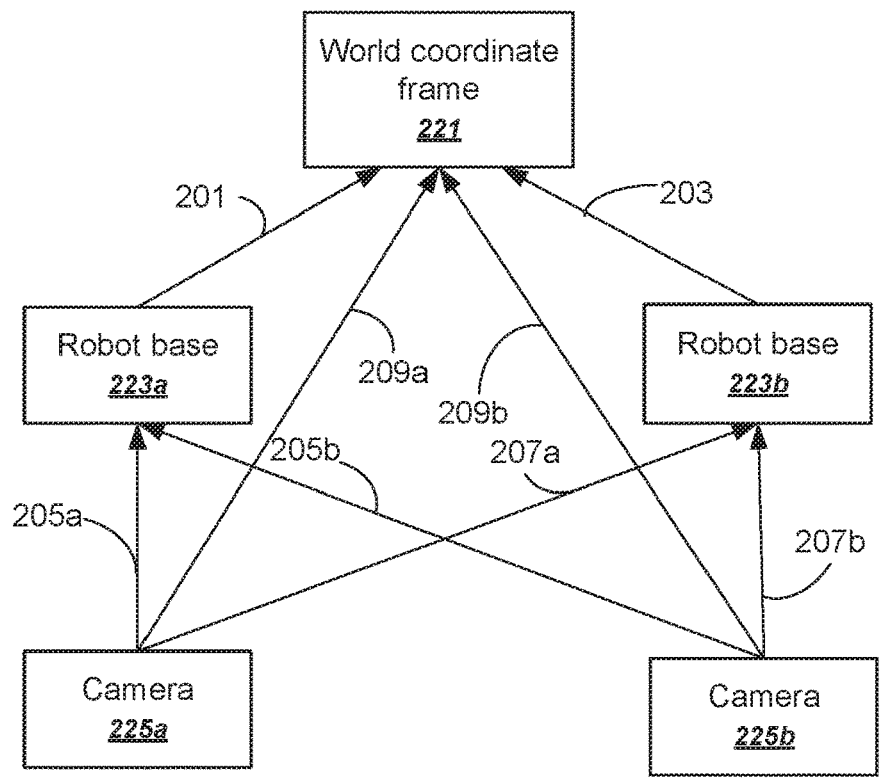
FIG. 2A illustrates an example of a relative pose constraint graph in an environment.

FIG. 2A illustrates an example relative pose constraint graph 100a in an environment. The relative pose constraint graph 100a represents relative pose constraint relationships between various calibration entities in the environment. A calibration system can use a relative pose constraint graph to represent constraint pairs in the environment. For example, the environment can be a robot workcell.

Nodes of a constraint graph can represent calibration entities. As shown in FIG. 2A, the example relative pose constraint graph 200a includes nodes representing the following calibration entities: a world coordinate frame 221, a base of a first robot 223a, a base of a second robot 223b, a first camera 225a, and a second camera 225b.

Edges of a constraint graph can represent relationships between calibration entities. For example, the directed edges of the relative pose constraint graph 200a represent a relative pose of a first calibration entity with respect to a coordinate frame defined by a second calibration entity. For example, the edge 205b represents the pose of the camera 225b with respect to the coordinate frame defined by the robot base 223a.

The world coordinate frame 221 in FIG. 2A has an origin, and the origin can be pre-determined in a world model, e.g., a workcell model. It is usually not of interest to define the pose of the world origin with respect to a coordinate frame, as the origin is assumed fixed and the world coordinate frame is normally assumed fixed and serves as an overall reference for calibrating the entities in the workcell. In this context, "fixed" means being static and not involved in optimization processes when a workcell is under calibration. Thus, a world coordinate frame can serve as a reference coordinate frame for a workcell or a world model. In some implementations, a workcell or a world model only has one reference coordinate frame.

A base of a robot can have a pose, a coordinate frame defined by the pose and a coordinate frame in which the pose is measured. For example, the base of the first robot 223a and the base of the second robot 223b, each define a respective origin and a coordinate frame. The origin of the base 223a has a pose 201 with respect to the world coordinate frame, and similarly, the origin of the base 223b has a pose 203 with respect to the world coordinate frame as well. Each pose, 201 or 203, of the origin of the respective base, 223a or 223b, can have both translational and rotational degrees of freedom.

A camera can also have a pose, e.g., a pose defined by its focal point; a coordinate frame defined by the pose; and a coordinate frame that the pose is measured in. For example, each camera 225a and 225b can have a defined focal point and a corresponding coordinate frame defined by each focal point. The first camera represented by the node 225a can have a first pose 205a with respect to the coordinate frame of the robot base 223a, a second pose 207a with respect to the coordinate frame of the robot base 223b, and a third pose 209a with respect to the world coordinate frame. Similarly, the second camera represented by the node 226b can have a first pose 205b with respect to the coordinate frame of the robot base 223a, a second pose 207b with respect to the coordinate frame of the robot base 223b, and a third pose 209b with respect to the world coordinate frame.

Obtaining the focal point poses of cameras with respect to a respective robot base can include obtaining poses of each joint in the respective robot, as well as coordinate frames defined by the poses of each joint. For example, an industrial robot can have six joints, J1 to J6, with each joint defining a pose and a coordinate frame based on the pose for the joint. A focal point pose of the camera with respect to the industrial robot base can be obtained by chaining a focal point pose of a camera with respect to a coordinate frame based on the last joint J6 of the robot through each succeeding joint of the robot. Each pose of a succeeding joint of the robot can be defined with respect to a pose of a preceding joint of the robot, and a pose of the first joint J1 of the robot can be defined with respect to a coordinate frame of the robot base.

A relative pose can be a pose of a calibration entity with respect to another coordinate frame. For example, the first pose 205a of the first camera 225a with respect to the coordinate frame of the robot base 223a is referred to as a relative pose, as the coordinate frame defined by the robot base 223a is not the reference coordinate frame. Similarly the first pose 205b of the second camera 225b with respect to the coordinate frame of the robot base 223b is also considered a relative pose.

The relative poses in the graph 200a can be obtained in a variety of ways, e.g., by using hand-eye calibration processes or by direct measurements. For example, the relative poses, e.g., relative poses 205a and 205b, can be obtained using a plurality of respective measurements with hand-eye calibrations. For the hand-eye calibration for the relative pose 205a, the hand-eye calibration can have the robot base 223a as a "hand," and the camera 225a as an "eye" of the hand-eye calibration process. Alternatively or in addition, other relative poses, e.g., the relative poses 205b, 207a, and 207b, can be obtained from measurements and may be referred to as measured relative poses.

A relative pose can be also computed through poses of a camera and a robot base with respect to the world coordinate frame 221. For example, the relative pose 205a can be computed based on the pose 201 of the robot base 223a with respect to the world coordinate frame 221 and the pose 209a of the camera 225a with respect to the world coordinate frame 221. The relative poses 205b, 207a, and 207b, can be computed in a similar fashion. Relative poses obtained through poses with respect to a reference coordinate frame may be referred to as computed relative poses.

A relative pose constraint can be used to optimize relative poses between two different coordinate frames, each based on an optimizable calibration entity. In some implementations, one of the two different coordinate frames can be defined by a calibration entity that is not optimizable. In contrast to hand-eye calibrations, the relative pose constraint can be applied between two different coordinate frames defined by two arbitrarily chosen optimizable calibration entities in an environment. For example, as depicted in FIG. 2A, a first relative pose constraint can have a first coordinate frame defined by the first robot base 223a and a second coordinate frame defined by the first camera 225a. Similarly, a second relative pose constraint can have a first coordinate frame defined by the first robot base 223a and a second coordinate frame defined by the second camera 226b. The rest of the relative pose constraints in FIG. 2A can be defined in a similar way.

To optimize relative poses between two different coordinate frames, the calibration system described in this specification can first find a reference coordinate frame, e.g., the world coordinate frame 221, denoted here with a superscript w. Then, the system can then define poses of two different coordinate frames A and B with respect to the reference coordinate frame, as $T_A^w$ and $T_B^w$. In some implementations, $T_A^w$ and $T_B^w$ are tensorial quantities representing both translational and rotational degrees of freedom of coordinate frames A and B with respect to the reference coordinate frame. Alternatively, $T_A^w$ and $T_B^w$ can be vectors. For example, in FIG. 2A, the coordinate frame A is the coordinate frame of the first robot base 223*a* and the coordinate frame B is the coordinate frame of the first camera 225*a*, respectively. Next, the system can obtain a measured relative pose of the coordinate frame B with respect to the coordinate frame A, e.g., $T_B^A$. For example, the measured relative pose $T_B^A$ can be the pose 205*a* of the first camera 225*a* with respect to the coordinate frame of the first robot base 223*a*. The measured relative pose $T_B^A$ can be obtained by circle calibrations with cameras or hand-eye calibrations. The measured relative pose $T_B^A$ can be assumed to be accurate and can serve as a benchmark. Finally, the system can define a computed relative pose $\bar{T}_B^A$ as:

$$\bar{T}_B^A = T_A^{w-1} T_B^w,$$

And, if the poses of each of the two coordinate frames A and B are sufficiently accurate, the system can use the constraint $\bar{T}_B^A = T_B^A$. However if not, the system can define a difference between $\bar{T}_B^A$ and $T_B^A$ by a residual as:

$$(T_A^{w-1} T_B^w)^{-1} T_B^A.$$

Finally, the calibration system can define an optimization problem for the relative pose constraint as:

$$\bar{T}_A^W, \bar{T}_B^W = \operatorname{argmin}_{T_A^w, T_B^w} (T_A^{w-1} T_B^w)^{-1} T_B^A.$$

The residual $(T_A^{w-1} T_B^w)^{-1} T_B^A$ can be defined in a variety of ways. In some implementations, the residual represents an aggregation of error terms. For example, the residual can be a scalar representing a root mean square error (RMSE), incorporating errors from both translational and rotational degrees of freedom. For another example, the residual can be two scalars representing two RMSEs incorporating errors from translational and rotational degrees of freedom respectively. By minimizing the residual of the optimization problem defined in the relative pose constraint, the system can obtain respective desired poses of the two coordinate frames A and B, e.g., $T_A^W$, $T_B^W$.

Figure 2B:
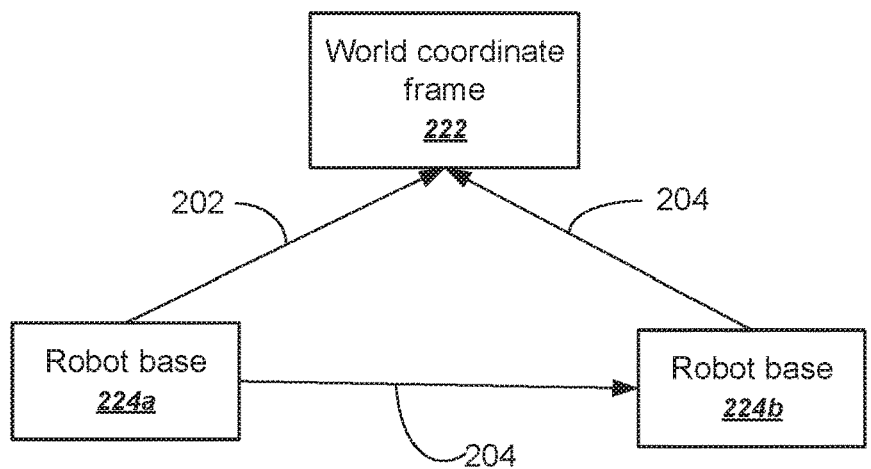
FIG. 2B illustrates another example of a relative pose constraint graph in an environment.

Alternatively or in addition, a relative pose constraint can be applied between two different coordinate frames of two robot bases in an environment. As shown in FIG. 2B, an example relative pose constraint includes a world coordinate frame 222, a first robot base 224*a* that defines a pose 202 with respect to the world coordinate frame 222 and a first coordinate frame defined by the pose 202, and a second robot base 224*b* that defines another pose 204 with respect to the world coordinate frame 222 and a second coordinate frame defined by the pose 204. The measured relative pose 204 is a pose of the first robot base 224*a* with respect to the coordinate frame of the second robot base 224*b*. The computed relative pose can be computed from poses 202 and 204 in the manner described above.

A benefit to the approaches described in this specification is that they can be scaled to an arbitrary number of calibration entities. Thus, the number of sensors and robots in an environment can be more than two, for example, 10 sensors and 10 robots, or 100 sensors and 100 robots. FIG. 2A only shows two sensors and two robots for the ease of illustration. Similarly, FIG. 2B only shows two sensors for the same reason.

A second example constraint type is a feature pose constraint. A feature pose constraint enforces a consistent pose of a calibration entity when the same entity is observed from two different coordinate frames. The different coordinate frames can be defined by a first and a second optimizable calibration entity, with respect to a common middle coordinate frame. In some implementations, the common middle coordinate frame is a world coordinate frame, or another reference coordinate frame. Without losing generality, the feature pose constraint can be viewed as optimizing a relative pose constraint between the two different coordinate frames defined by the first and second optimizable calibration entities indirectly such that at least a third coordinate frame is served as a common coordinate frame. The calibration entity in a feature pose constraint can be any arbitrary shape, size, and type, as long as the calibration entity has both translational and rotational degrees of freedom, and the degrees of freedom can be detected in the two different coordinate frames defined by the first and second optimizable calibration entities. For example, the calibration entity can be a sensor, a robot, or a marker. The first or the second optimizable calibration entity can be a sensor or a robot. The marker can be an artificial visual marker with both translational and rotational degrees of freedom that can be detected by a sensor. For example a marker can be a visual fiducial system tag, an AR marker, or some other kind of marker. The sensor for observing such markers can be any appropriate camera.

Figure 3:
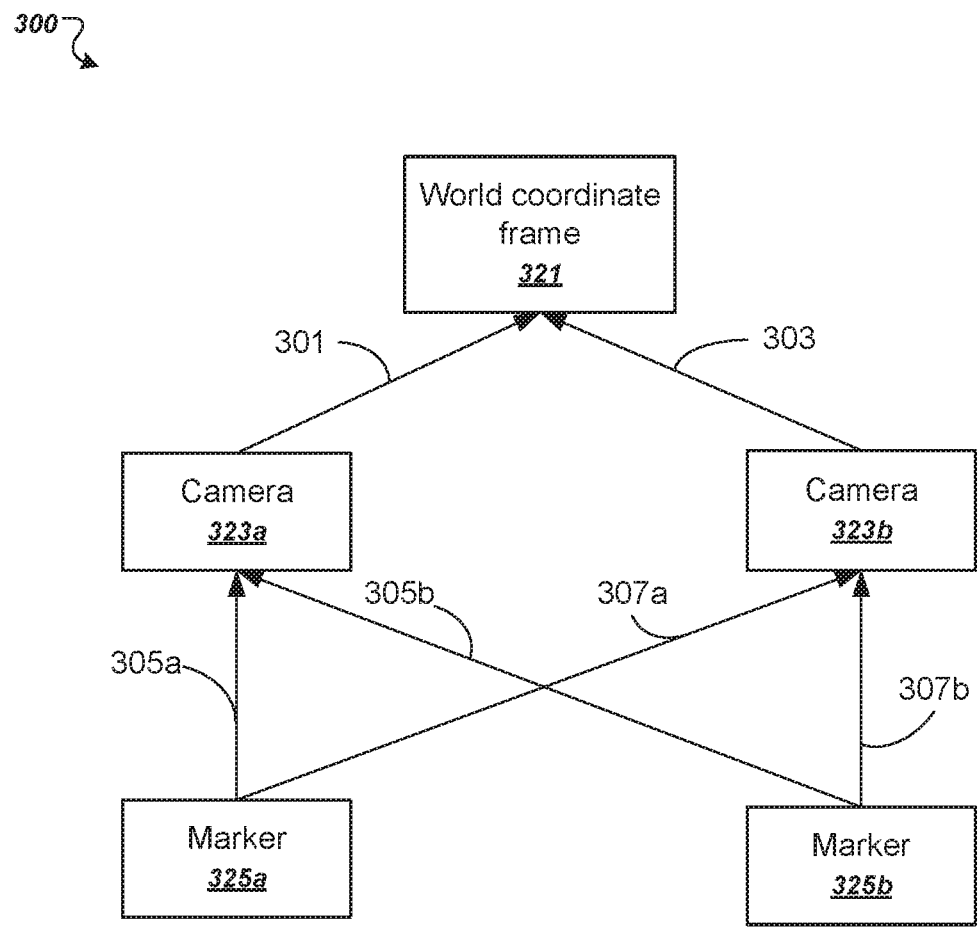
FIG. 3 illustrates an example of a feature pose constraint graph in an environment.

FIG. 3 illustrates an example feature pose constraint graph 300 in an environment. The feature pose constraint graph 300 represents constraint relationships between various calibration entities in the environment. The environment, for example, can be a robot workcell.

As shown in FIG. 3, the example feature pose constraint graph 300 includes nodes representing the following calibration entities: a world coordinate frame 321, a first camera 323*a*, a second robot 323*b*, a first marker 325*a*, and a second marker 325*b*. The directed edges of the feature pose constraint graph 300 represent a relative pose of a first calibration entity with respect to a coordinate frame defined by a second calibration entity. For example, 307*a* represents the pose of the marker 325*a* with respect to the coordinate frame defined by the camera 323*b*.

The world coordinate frame 321 can be pre-determined and fixed in the workcell model. The world coordinate frame 321 serves as a reference coordinate frame as it is static and will not be modified during the optimization processes. A focal point of the first camera 323*a* can define a first coordinate frame and a pose 301 of the coordinate frame with respect to the world coordinate frame 321. Similarly, a focal point of the second camera 323*b* can define a second coordinate frame and a pose 303 of the coordinate frame with respect to the world coordinate frame 321.

A node representing the first marker 325*a* can define a third coordinate frame, a first pose 305*a* of the first marker 325*a* with respect to the first coordinate frame of the first camera 323*a*, a second pose 307*a* of the first marker 325*a* with respect to the second coordinate frame of the second camera 323*b*. The poses 305*a* and 307*a* can be obtained by the image data of the first maker 325 taken by cameras 323*a* and 323*b* respectively. Similarly, a node of the second marker 325*b* defines a fourth coordinate frame, a third pose 305*b* of the second marker 325*b* with respect to the first coordinate frame of the first camera 323*a*, as well as a fourth pose 307*b* of the second marker 325*b* with respect to the second coordinate frame of the second camera 323*b*. The poses 305*a*, 305*b*, 307*a*, and 307*b* can include both translational and rotational degrees of freedom of respective markers with respect to respective coordinate frames in which the poses are measured, as described earlier.

A feature pose constraint can be used to optimize poses of two different coordinate frames defined by two optimizable calibration entities such that a calibration entity observed by the two different frames appears a consistent pose with respect to the world coordinate frame. For example, as shown in FIG. 3, the two different coordinate frames can be the coordinate frame defined by the first camera 323a and the coordinate frame defined by the second camera 323b, and the calibration entity can be either the first marker 325a or the second marker 325b.

To optimize poses of two different coordinate frames A and B, the calibration system can first define a world coordinate frame 321 as a reference coordinate frame, noted by a superscript w. Next, the system can define a pose of the calibration entity with respect to each of the two different coordinate frames A and B defined by a first and a second optimizable calibration entities, noted as $T_F^A$ and $T_F^B$. $T_F^A$ and $T_F^B$ are tensorial quantities representing both translational and rotational positions of the calibration entity with respect to coordinate frames A and B respectively. In some implementations, $T_F^A$ and $T_F^B$ can be vectors. Then, the system can define the poses of the two coordinate frames A and B with respect to the world coordinate frame 321 as $T_A^w$ and $T_B^w$.

Ideally, if both poses of the two coordinate frames A and B defined by the first and second optimizable calibration entities are accurate with respect to the world coordinate frame 321. The identity given as below should hold:

$$T_A^w T_F^A = T_B^w T_F^B.$$

However if any one of the two poses of the two coordinate frames A and B is not accurate or deviated slightly from respective expected poses, the identity does not hold. The system can define a difference between $T_A^w T_F^A$ and $T_B^w T_F^B$ by a residual as:

$$(T_A^w T_F^A)^{-1} T_B^w T_F^B.$$

Thus the system can define an optimization problem for the feature pose constraint as:

$$\bar{T}_A^W, \bar{T}_B^W = \operatorname{argmin}_{T_A^w, T_B^w} (T_A^w T_F^A)^{-1} T_B^w T_F^B$$

Similarly, the residual $(T_A^w T_F^A)^{-1} T_B^w T_F^B$ can be defined in many ways. For example, the residual can be a scalar representing a root mean square error (RMSE) incorporating errors from both translational and rotational degrees of freedom. For another example, the residual can be two scalars representing two RMSEs incorporating errors from translational and rotational degrees of freedom respectively. For another example, the residual can be a tensor and the outcome of this residual is minimized if the tensor is an identity tensor. By minimizing the residual of optimization problem defined in feature pose constraint, the system can obtain the desired poses of the two coordinate frames A and B, e.g., $T_A^W$, $T_B^W$.

Alternatively or in addition, two relative pose constraints can serve as a feature pose constraint. To see this, a first relative pose constraints can have a first coordinate frame defined by a calibration entity, e.g., a marker and a second coordinate frame defined by a first optimizable calibration entity, e.g., a first sensor, and a second relative pose constraint can have the first coordinate frame defined by the marker and a third coordinate frame defined by a second optimizable calibration entity, e.g., a second sensor. Given that, in the first relative pose constraint, a first relative pose of the marker with respect to the first coordinate frame can be used to calibrate the pose of the first sensor; in the second relative pose constraint, a second relative pose of the marker with respect to the second coordinate frame can be used to calibrate the pose of the second sensor, which is equivalent to a feature pose constraint to calibrate the poses of two sensors through the marker. In fact, the difference between a feature pose constraint and a relative pose constraint can be viewed as that the feature pose constraint measures a relative pose between two coordinate frames indirectly while the relative pose constraint measures a relative pose between two coordinate frames directly. However, in some situations, a feature pose constraint has a lower computation cost than a relative pose constraint when calibrating poses of two different coordinate frames. Therefore, the system may choose feature pose constraints over relative pose constraints in order to reduce computational complexity of the optimization processes.

A third example constraint type is a feature point constraint. A feature point constraint is similar to a feature pose constraint, but a feature point constraint uses measurements of point-wise poses, instead of poses, of a calibration entity observed by two different coordinate frames defined by a first and a second optimizable calibration entities. A feature point constraint can be used to ensure a consistent point-wise pose of the calibration entity with respect to a common middle coordinate frame. In some implementations, the common middle coordinate frame is a world coordinate frame, or another reference coordinate frame. A feature point constraint can also be viewed as optimizing a relative pose constraint between the two different coordinate frames defined by the first and second optimizable calibration entities indirectly such that at least a third coordinate frame is served as a common coordinate frame.

The calibration entity in a feature point constraint can be any arbitrary shape and size, with only translational degrees of freedom that are detectable in the two different coordinate frames defined by the first and second optimizable calibration entities in the constraint. In other words, the calibration entity in a feature point constraint can have both translational and rotational degrees of freedom, but the two coordinate frames may be capable of detecting only translational degrees of freedom of the feature. For example, the calibration entity can still be a sensor, a robot, a marker but with the two optimizable calibration entities being point sensors such as laser trackers. For another example, the calibration entity can be a point-wise feature with two optimizable calibration entities being sensors at least capable of detecting translational degrees of freedom of the point-wise feature. The point-wise feature can be a single dot or a small sticker that a sensor can detect. For example, the point-wise feature can be a small ping-pong-ball-like marker that can reflect infrared light in a motion capture system, a robot end-efforts (e.g., a tooltip in a robot's gripper), a touch point (e.g., the touch point of two tooltips each from a respective robot), and other contact points such as a table corner.

In particular, the system can utilize a plurality of feature point constraints to optimize both translational and rotational degrees of freedom, e.g., a full 3D pose, of an optimizable calibration entity, using only point-wise features of the calibration entity. For example, the system can calibrate three or four different corners of a table using feature point constraints respectfully and combine the calibration results to uniquely optimize the full 3D pose of the table.

Figure 4:
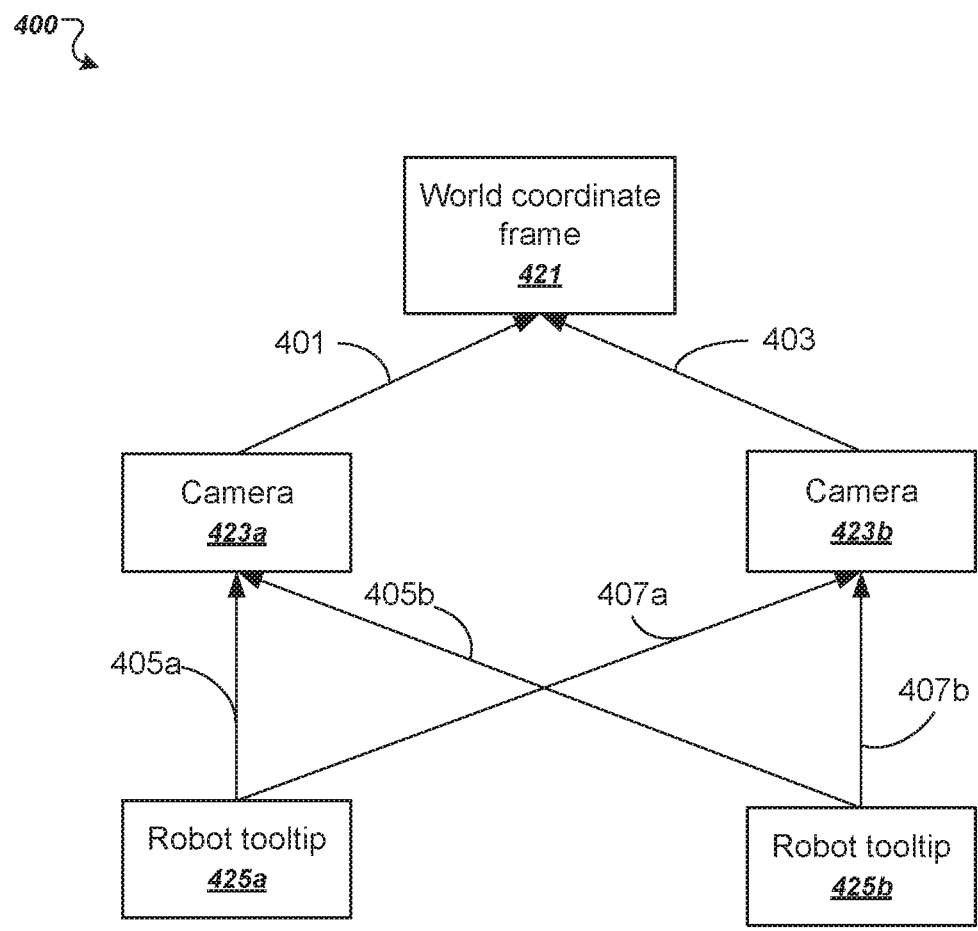
FIG. 4 illustrates an example of feature point constraint graph in an environment.

FIG. 4 illustrates an example feature point constraint graph 400 in an environment. The example feature point constraint graph 400 represents constraint relationships between various calibration entities in an environment. The environment, for example, can be a robot workcell.

As shown in FIG. 4, the example feature point constraint graph 400 includes nodes representing the following calibration entities: a world coordinate frame 421, a first camera 423a, a second robot 423b, a tooltip of a first robot 425a and a tooltip of a second robot 425b. The directed edges of the feature point constraint graph 400 represent a relative pose of a first calibration entity with respect to a coordinate frame defined by a second calibration entity. For example, 407a represents the pose of the robot tooltip 425a with respect to the coordinate frame defined by the camera 423b.

Similarly, the world coordinate frame 421 can be predetermined and fixed in the workcell model, serving as a reference coordinate frame and will not be optimized. A focal point of the first camera 423a defines a first coordinate frame and a pose 401 of the first camera 423a with respect to the world coordinate frame 421. Similarly, a focal point of the second camera 423b defines a second coordinate frame and a pose 403 of the second camera 423b with respect to the world coordinate frame 421. A tooltip of the first robot 425a defines a third coordinate frame, a first point pose 405a of the first robot tooltip 425a with respect to the first coordinate frame of the first camera 423a, a second point pose 407a of the first robot tooltip 425a with respect to the second coordinate frame of the second camera 423b. Similarly, a tool tip of the second robot 425b defines a fourth coordinate frame, a third point pose 405b of the second tooltip 425b with respect to the first coordinate frame of the first camera 423a, a fourth point pose 407b of the second tooltip 425b with respect to the second coordinate frame of the second camera 423b. The point poses 405a, 405b, 407a and 407b includes only translational degrees of freedom of tooltips with respect to respective coordinate frames, as described earlier.

As explained earlier, a feature point constraint can be used when measured features only have a point-wise pose instead of a pose, to optimize point-wise poses of two different coordinate frames defined by a first and second optimizable calibration entities such that a calibration entity observed by the two different frames appear a consistent point-wise pose with respect to the world coordinate frame. For example, as shown in FIG. 4, the two different coordinate frames can be the first coordinate frame defined by the first optimizable calibration entity, e.g., camera 423a and the second coordinate frame defined by the second optimizable calibration entity, e.g., camera 423b, and the point-wise feature of the calibration entity observed by the two different coordinate frames can be either the tooltip of the first robot 425a or the tooltip second robot 425b. Alternatively, the two coordinate frames can be defined by optimizable calibration entities that only take translational positions of a feature, such as point sensors, e.g., laser trackers.

To optimize poses of two different coordinate frames A and B defined by the first and second calibration entities, the calibration system can first define a world coordinate frame 421 as a reference coordinate frame, noted by a superscript w. Next, the system can define a point-wise pose observed with respect to two different coordinate frames A and B, noted as $T_P^A$ and $T_P^B$. $T_P^A$ and $T_P^B$ are tensorial quantities representing only translational positions of the point-wise calibration entity. In some implementations, $T_P^A$ and $T_P^B$ can be vectors. Then, the system can define the poses of the two coordinate frames A and B with respect to the world coordinate frame 421 as $T_A^w$ and $T_B^w$.

Ideally the expected point-wise pose of the calibration entity should be consistent with respect to the world coordinate frame as given by:

$$T_A^w T_P^A = T_B^w T_P^B.$$

However if any one of poses of the two different coordinate frames A and B is not accurate or deviated slightly from respective expected poses, the equality does not hold. The system can define a difference in a form of a residual as:

$$(T_A^w T_P^A)^{-1} T_B^w T_P^B.$$

Then, the system can define an optimization problem for the feature point constraint as:

$$\bar{T}_A^W, \bar{T}_B^W = \mathrm{argmin}_{T_A^w, T_B^w} (T_A^w T_P^A)^{-1} T_B^w T_P^B$$

Each point-wise pose with respect to each of the coordinate frames A and B only conveys translational positions of a point-wise feature, thus the residual can be a three-dimensional difference tensor between the two measured point-wise poses with respective to the world coordinate frame. The residual is said to be minimized if the difference tensor is a three-dimensional identity tensor. Alternatively, the residual can still be a scalar representing a root mean square error (RMSE) incorporating errors from translational degrees of freedom. By minimizing the residual of the optimization problem defined in the feature point constraint, the system can obtain the desired poses of the two coordinate frames A and B, e.g., $\bar{T}_A^W$, $\bar{T}_B^W$.

In general, for each of the plurality of relative pose constraints, feature pose constraints and feature point constraints, the poses of the two coordinate frames in a respective constraint pair can be optimized by minimizing the residual defined in the type of the constraint pair. Optimizing each constraint pair is also referred to as local optimization. And the outputs of a local optimization for a constraint pair can be used to locally calibrate poses for the two coordinate frames during calibration. To compute outputs of local optimizations in each respective constraint pair, one or more optimizers 150 can be used. For example, an optimizer 150 can be a program carried out by one or more computers to solve an optimization problem. Optimizers 150 can be configured to carry out computation in a parallel fashion. For example, the system can utilize GPU acceleration to compute outputs of local optimizations one or more optimizers.

Local optimization includes minimizing a local error of a constraint of the plurality of different constraint pairs. For example, a hand-eye calibration optimizes a local error based on a residual defined in the hand-eye calibration. However, if one or more coordinate frames are involved in more than one constraint pairs, a first output of a second local optimization for a coordinate frame in a first constraint pair can be different from a second output of a second local optimization for the same coordinate frame in a second constraint pair. Hence sometimes not all constraint pairs can be locally optimized at the same time. This is because the optimization problems defined by each local constraint pair in an environment are over-constrained, e.g., there are more constraints than values to optimize robots and sensors in the environment.

To optimize the total optimization problems, the calibration system can define a global error based on each local error defined in each of the plurality of constraint pairs. For example, a global error can include summing up each local error defined in each of the plurality of constraint pairs. For another example, a global error can include a plurality of weights based on the calibration importance of each of the plurality of constraint pairs. The calibration system can first multiply each local error with a respective weight, and obtain a global error by summing up each weighted local error. By minimizing the global error using one or more optimizers, the calibration system can obtain a set of global optimized poses for coordinate frames in the plurality of constraint pairs.

Figure 5:
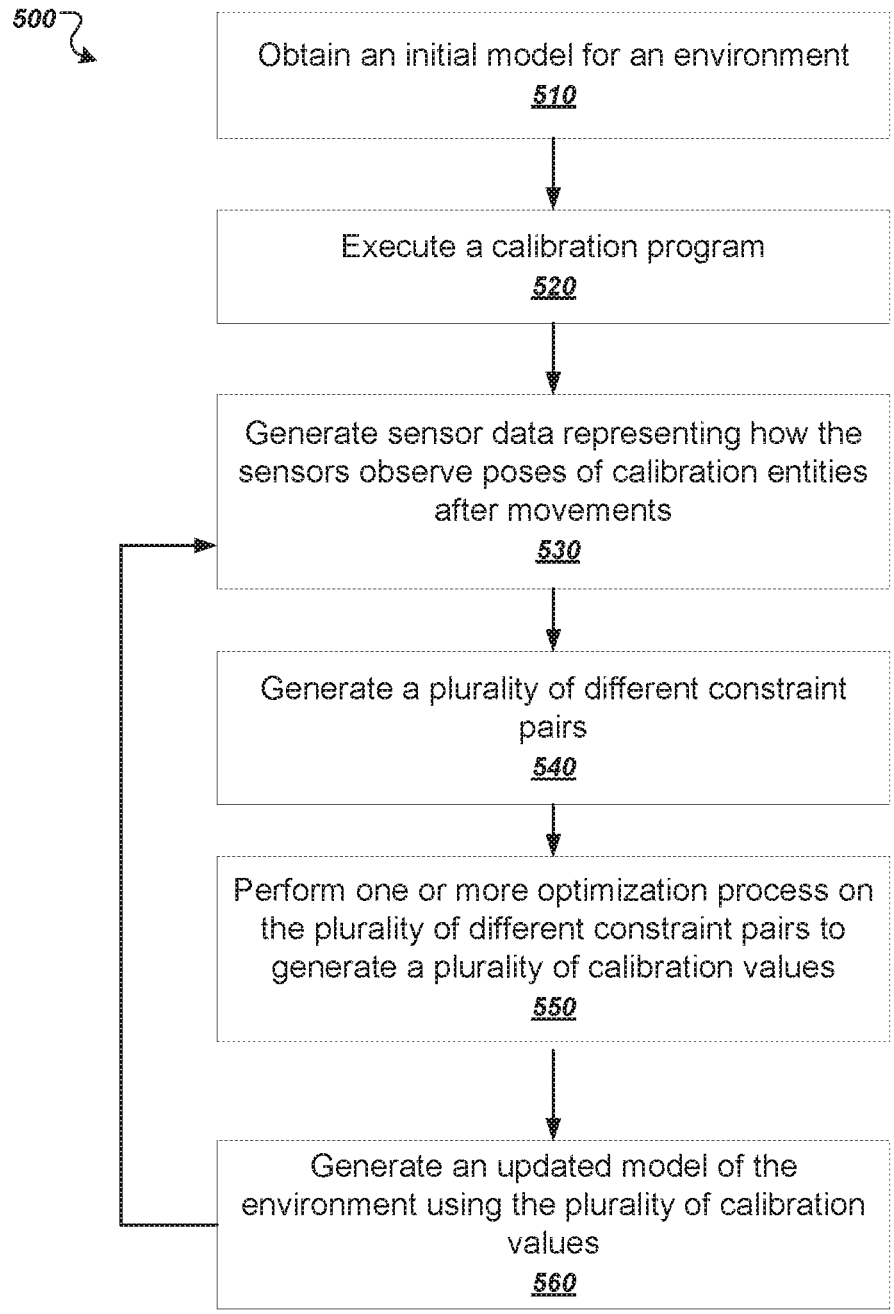
FIG. 5 is a flow diagram of an example process of optimizing calibrations using different constraint pairs in an environment.

FIG. 5 is a flow diagram of an example process 500 of optimizing calibration using different constraint pairs in an environment. For convenience, the process 500 will be described as being performed by a system of one or more computers located in one or more locations. For example, a calibration system 100, appropriately programmed, can perform the process 500.

As shown in FIG. 5, the system can first obtain an initial model for a workcell (510), e.g., a world model. The world model includes a plurality of robots and a plurality of sensors. The plurality of sensors are configured to observe movements of one of more robots in the workcell. Each of the plurality of sensors can be a camera or a laser tracker. The initial world model can be obtained through a CAD simulation. The poses of robots and sensors in the world model may be deviated from the expected poses defined in the initial world by the CAD simulation.

The system instructs the calibration execution engine 110 to execute a calibration program (520). The calibration program generates movement data that represents movements by the one or more of robots within the workcell 170. The movement data describes how each robot, e.g., 170a-n, or sensor, e.g., 171a-n, moves in the workcell 170 to perform tasks. The movement data can be purely simulated by the work flow schedule engine 120 or measured by actual movements of each robot or sensor for each time step at a certain time step interval by the robot interface subsystem 160. Each robot or sensor can have a pose that defines a respective translational and/or rotational position of the robot and sensor. The movement data at each time step defines a motion of a robot and/or a sensor from an initial pose to an end pose of the robot and/or the sensor. In some implementations, the system 100 can instruct the robot interface subsystem 160 to adjust poses of each robot and sensor and move them in the workcell as predicted by the work flow. In some implementations, one or more robots or sensors in the workcell can be static, e.g., the robots and sensors are fixed and the respective poses of the robots and sensors cannot be adjusted. Particularly, the static robots or sensors are assumed to be posed accurately, e.g., the error between a measured pose and an expected pose of a robot or a sensor is within a range of +/−5 mm, and/or +/−1 degree. In some implementations, one or more sensors 171a-n can be attached or mounted to one or more robots 170a-n in the workcell 170. Alternatively, sensors can be independent of robots in a workcell.

The system generates sensor data representing how the sensors observe poses after the movements by the plurality of robots within the workcell during execution of the calibration process (530). The sensor data is collected by the robot interface subsystem 160 and sent as input to the constraint generator 130 in the calibration execution engine 110. For convenience, we can refer to the plurality of robots 170a-n, sensors 171a-n, markers 172a-n and point-wise features 173a-n observed in the workcell as a plurality of calibration entities, whereas robots and sensors that can be adjusted as optimizable calibration entities. As mentioned earlier, the sensors, and or robots can observe poses of calibration entities at a current time step in the work flow. The respective poses at the current time step stand for actual poses that calibration entities end up with after movements at the end of the time step with respect to the world model. The current pose of a calibration entity can be different from an expected pose of the calibration entity due to initial pose error or accumulated pose error after moving based on a work flow. The accumulated pose error can exist since the initial time step of the work flow.

The system generates a plurality of different constraint pairs based on the sensor data (540). Each of the plurality of different constraint pairs specifies a relationship between poses of calibration entities that are observed with different coordinate frames each based on an optimizable calibration entity and are represented in the sensor data. As mentioned earlier, each calibration entity can have a pose and a coordinate frame associated with the pose. The plurality of different constraint pairs can include a plurality of relative pose constraints, a plurality of feature pose constraints and a plurality of feature point constraints. The constraint generator 130 can specify a respective constraint pair with two coordinate frames in a workcell 170 accordingly. For example, if a relative pose between two optimizable calibration entities can be measured directly between two coordinate frames based on the two optimizable calibration entities, the constraint generator 130 can apply a relative pose constraint over the two optimizable calibration entities, as described earlier for FIG. 2A. For another example, if a relative pose of two optimizable calibration entities can be measured indirectly using a common middle coordinate frame, and the relative pose has both translational and rotational degrees of freedom detectable to the two coordinate frames defined by the two optimizable calibration entities, the constraint generator can apply a feature pose constraint over the two optimizable calibration entities, as shown in FIG. 3. For another example, if a relative pose of two optimizable calibration entities can be measured indirectly while the relative pose only has translational degrees of freedom detectable to the two coordinate frames defined be the two optimizable calibration entities, the constraint generator 130 can apply a feature point constraint over the two optimizable calibration entities, as shown in FIG. 4.

The system performs one or more optimization processes on the plurality of different constraint pairs to generate a plurality of calibration values (550). The optimization process can carry out by one or more optimizers in the system. As described earlier, each type of constraint pair defines a respective local error (residual). The calibration system can obtain a global error based each local error defined by the plurality of different constraint pairs in the workcell 170. Then the calibration system can minimize the global error by performing one or more optimization processes to obtain a plurality of optimized poses of the two coordinate frames in each constraint pair. The plurality of optimized poses for each robot and sensor in the workcell are used for calibration, e.g., the plurality of calibration values. Each of the plurality of calibration values can include both translational and rotational adjustments 165b for each adjustable robot and sensor. The adjustments 165b serves as input to the robot interface subsystem 160 to adjust poses of optimizable calibration entities in the workcell 170, e.g., adjustable robots and sensors. In some implementations, some of the plurality calibration values include only translational adjustments for each adjustable robot and sensor. The adjustments can be expected translational and rotational positions of each robot and sensor, or the discrepancy between the current positions and the expected positions of each robot and sensor. Alternatively, the plurality of calibration values can include adjustments 165*a* that are sent from the optimizers 150 to the work flow schedule engine 120 to update the work flow 125.

The system generates an updated model of the workcell using the plurality of calibration values (560). In other words, the system 100 can adjust the poses of optimizable calibration entities, e.g., robots 170*a-n* and sensors 171*a-n*, to respective expected poses based on the plurality of calibration values, e.g., adjustments 165*b*. Alternatively, the work flow schedule engine 120 can incorporate differences between the expected poses and current poses of calibration entities based on the adjustments 165*a* to offset the differences by updating the work flow 125, and send commands 155 to the robot interface subsystem 160 to drive the robots and/or sensors to move in the workcell 170 based on the updated work flow 125, without calibrating poses of the adjustable robots and sensors to the optimized poses.

Moreover, the system 100 can execute steps 530, 540, 550 and 560 again for a second calibration process 500 by generating a second plurality of different constraint pairs using the updated model of the workcell 170, performing one or more optimization processes on the second plurality of different constraint pairs to generate a second plurality of calibration values; and generating a second updated model of the workcell using the second plurality of calibration values. The detailed descriptions for steps 530, 540, 550 and 560 can be found in the above paragraphs. The second calibration process can be carried out by the system 100 at a consecutive time step right after the time step for the first calibration process. A third and more calibration processes can be carried out by the system sequentially in following time steps such that poses of each optimizable calibration entity within the workcell can be calibrated in-situ. In some implementations, the second calibration process can be carried out by the system 100 at a time step, for example, when the system 100 can instruct the workcell 170 to perform a second plurality of tasks after finishing a first plurality of tasks, for another example, when the number of calibration entities is changed in the workcell.

Further discussion about different constraint pairs of the system in an environment are elaborated in FIGS. 6A to 6C.

FIG. 6A illustrates relative pose constraints applied in an example environment. The example environment includes a workcell. The environment includes two robots 615 and 617, and each robot has a base. For example, the robot 615 has a base 611 that can define a coordinate frame and a pose of the coordinate frame with respect to the world model of the environment, while the robot 617 has a base 613 that can define a coordinate frame and a pose of the coordinate frame with respect to the world model of the environment. Also, each robot has three tool tips, as shown in FIG. 6C. For example, the robot 615 includes three tool tips 661, 663 and 663, and the robot 617 includes three tool tips 664, 665 and 566. The example environment also includes three sensors 601, 603 and 605. The three sensors can detect both translational and rotational positions of a pose. There are in fact 6 relative pose constraints depicted in the FIG. 6A, as there are 6 measured relative poses of a base to a sensor coordinate frame, e.g., 631-636. The total number of relative pose constraints in an environment can be more than 6. For example, an environment can include 12 relative pose constraints. Not all pairs of relative pose constraints are necessarily used in the optimization process, in fact, one or more pairs of relative pose constraints can be omitted when optimizing calibration.

FIG. 6B illustrates feature pose constraints applied in an example environment. Besides the sensors and robots, and three sensors can detect both translational and rotational positions of a pose, there are three markers 621, 623 and 617. Each marker can have a pose with respect to each of the sensor coordinate frames. And each pose of each marker includes both translational and rotational positions of the marker. There are 9 pairs of feature pose constraints depicted in FIG. 6B. For example, the pose 654 of the marker 621 with respect to the coordinate frame of sensor 601 and the pose 653 of the marker 621 with respect to the coordinate frame of sensor 603. Similarly, the total number of feature point constraints in an environment can be more than 9. For example, a workcell can include 20 feature pose constraints. Not all pairs of feature pose constraints are necessarily used in the optimization process, in fact, one or more pairs of feature pose constraints can be omitted when optimizing calibration.

FIG. 6C illustrates feature point constraints applied in an example environment. There are six tool tips 661-666 in the environment with 3 tooltips per robot. The pose of a tooltip is in fact a point with only translational positions. Thus the sensors in FIG. 6C are only required to be able to observe translational degrees of freedom. In other words, the sensors 601, 603 and 605 can be laser trackers instead of cameras. There are 18 feature point constraints in the environment in FIG. 6C. For example, the pose 675 of the tooltip 661 with respect to the coordinate frame of sensor 601 and the pose 672 of the tooltip 661 with respect to the coordinate frame of sensor 603. The number of feature point constraints in an environment can be different, as explained earlier.

Even though there are only two robots with each robot including a base and three tool tips, three sensors, and three markers for the ease of illustration, the number of robots, sensors and tool tips on a robot depicted in FIGS. 6A to 6C are purely illustrative. For example, there can be 10 sensors, 5 markers, 6 robots with each robot including 7 tool tips. For another example, there can be 2 sensors, 1 marker, 10 robots with each robot including 2 tool tips.

In general, the system can scale up the total number of different constraint pairs easily, as adding extra above-mentioned constraint pairs into the system will not require adding extra wirings or hardware, except for power lines to robots and sensors.

As mentioned earlier, a system can use any other appropriate constraint type. A number of additional example constraints will now be described: a distance constraint, a combined constraint, and a chained constraint.

A distance constraint can be used to optimize poses of two different coordinate frames defined by two optimizable calibration entities such that a calibration entity observed by the two different frames appears at a consistent pose with respect to the world coordinate frame. To optimize calibration entities, the distance constraint measures a distance between the two different coordinate frames. Particularly, if one of the two different coordinate frames is defined by a laser tracker, the distance constraint measures an orientation of the laser beam emitted by the laser tracker, using a 3D direction vector, and a distance between the two coordinate frames.

A combined constraint is a constraint that combines or aggregates a plurality of different types of constraints. For example, a combined constraint can be a combination of 3 feature point constraints with respect to a laser tracker. The combined constraint can be used to determine a full 3D pose of an optimizable calibration entity, e.g., a table, as described earlier.

A chained constraint is a constraint that links a plurality of different coordinate frames defined by each calibration entity using different constraints in a sequence. That is, instead of having a constraint directly connecting two coordinate frames A and B together, the chained constraint can include two more coordinate frames C and D using different constraints between coordinate frames A and B. For example, instead of constraining the two coordinate frames A and B using a relative pose constraint, the system can first constrain the coordinate frames A and C using a relative pose constraint, then constrain the coordinate frames C and D using a distance constraint, and finally constrain the coordinate frames D and B using a feature point constraint. Given that, the local error between coordinate frames A and B can be formalized through four coordinate frames, e.g., A, B, C, and D.

Figure 7:
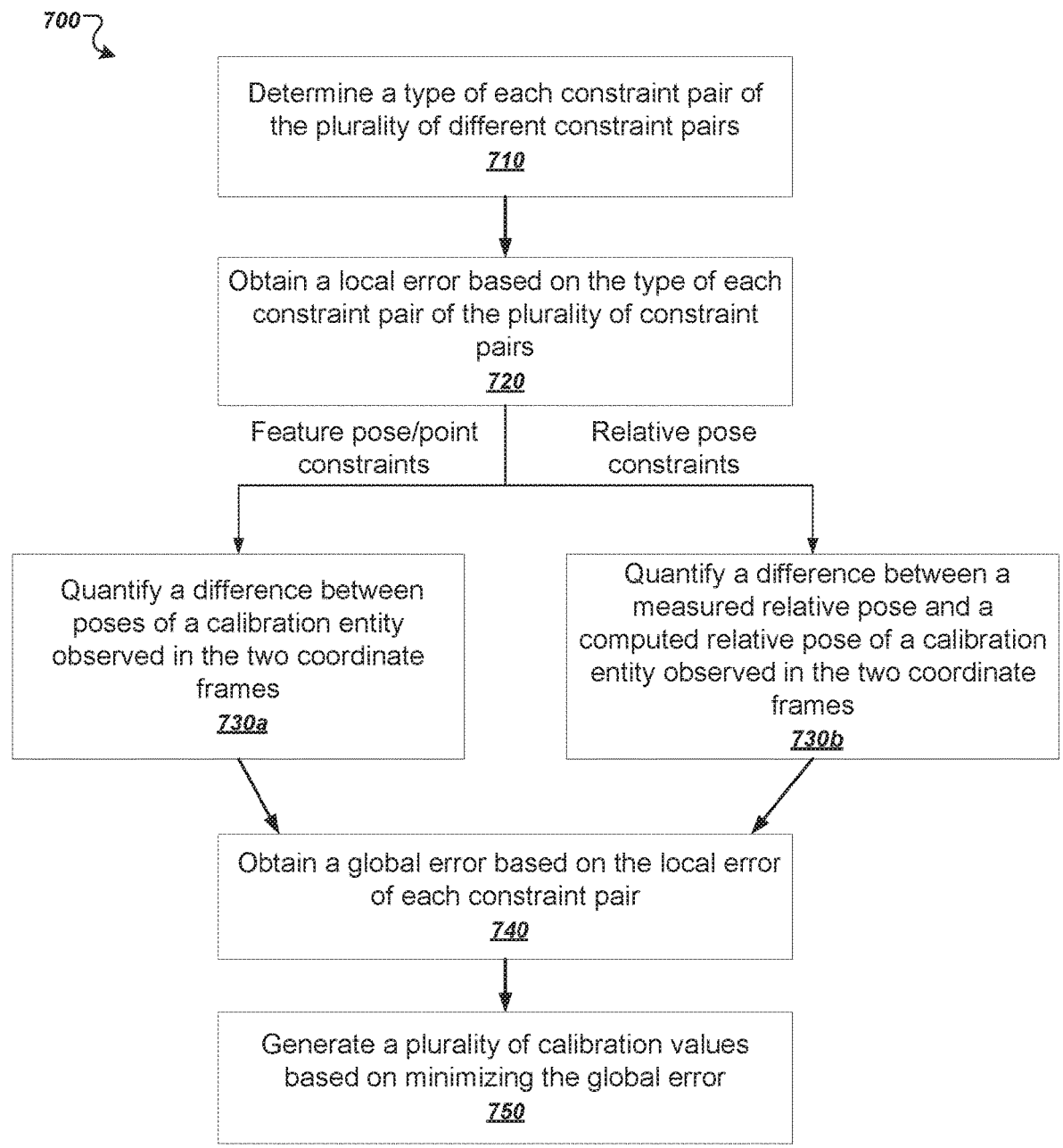
FIG. 7 is a flow diagram of an example process of obtaining calibration values based on the example process of optimizing calibration in FIG. 5.

FIG. 7 is a flow diagram of an example process of obtaining calibration values based on the process of optimizing calibration in FIG. 5. The system 100 can first determine a type of each of the plurality of different constraint pairs (710). For example, the system 100 can determine the type of a constraint pair to be a relative pose constraint, feature pose constraint or feature point constraint based on the type of the two coordinate frames each defined by an optimizable calibration entities, and the poses of calibration entities observed in the two coordinate frames.

The system 100 can then obtain a local error based on the type of each constraint pair of the plurality of constraint pairs (720). If the constraint pair is determined as a feature pose constraint or a feature point constraint from step 710, the system can quantify a difference between poses of a calibration entity observed in the two different coordinate frames each defined by an optimizable calibration entity (730a). If the constraint pair is determined as a relative pose constraint from step 710, the system can quantify a difference between a measured relative pose and a computed relative pose between two optimizable calibration entities observed in two coordinate frames defined by the two optimizable calibration entities (730b). In some implementations, the difference can be a residual defined for each constraint type as described earlier.

Then based on each local error of each constraint pair of the plurality of constraint pairs, the system 100 can obtain a global error based on each local error (740), as described earlier in FIG. 5.

In particular, for each optimizable calibration entity, the system 100 can compare every local error of each different constraint pair associated with the optimizable calibration entity, determine if at least one or more local errors are substantially larger than the others, and in response to determining that at least one or more local errors are substantially larger than the others, not taking into account the at least one or more local errors for the global error, and/or identifying mistakes in the calibration process. For example, the system can detect one or more systematic errors in the calibration process, e.g., accidentally using camera B instead of camera A to obtain a pose of a robot R with respect to the camera A.

Finally, the system 100 can generate a plurality of calibration values based on minimizing the global error (750) using one or more optimizers 150, as described in detail in FIG. 5. In some implementations, the system 100 can infer one or more systematic errors if the optimization process cannot converge when minimizing the global error.

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining an initial model of an environment comprising a plurality of calibration entities including a plurality of sensors and a plurality of robots, each of the plurality of sensors configured to observe movements by one or more calibration entities in the environment;
  executing a calibration program that generates movement data representing movements by the plurality of robots within the environment;
  generating sensor data representing how the sensors observe poses of calibration entities after the movements by the plurality of robots during execution of the calibration program;
  generating, from the sensor data, a plurality of different constraint pairs, wherein each of the plurality of different constraint pairs specifies a relationship between poses of calibration entities that are observed in different coordinate frames;
  performing one or more optimization processes on the plurality of different constraint pairs to generate a plurality of calibration values; and
  generating an updated model of the environment using the plurality of calibration values.

Embodiment 2 is the method of embodiment 1, wherein each of the plurality of different constraint pairs comprises at least two different coordinate frames each defined by a calibration entity.

Embodiment 3 is the method of any one of embodiments 1-2, wherein each constraint pair of the plurality of different constraint pairs comprises at least a calibration entity to be observed in different coordinate frames.

Embodiment 4 is the method of any one of embodiments 1-3, wherein the plurality of different constraint pairs comprise a relative pose constraint that defines a relationship between a measured relative pose and a computed relative pose of a first coordinate frame observed in a second coordinate frame, wherein the first coordinate frame is defined by a first calibration entity and the second coordinate frame is defined by a second calibration entity.

Embodiment 5 is the method of embodiment 4, wherein the measured relative pose and the computed relative pose of the first coordinate frame comprise both translational and rotational positions observable to the second coordinate frame.

Embodiment 6 is the method of any one of embodiments 1-5, wherein the plurality of different constraint pairs comprise a feature pose constraint that defines a relationship between feature poses of a calibration entity observed in two different coordinate frames each defined by a calibration entity.

Embodiment 7 is the method of embodiment 6, wherein the feature poses of the calibration entity comprise both translational and rotational positions.

Embodiment 8 is the method of any one of embodiments 1-7, wherein the plurality of different constraint pairs comprise a feature point constraint that defines a relationship between point-wise poses of a calibration entity observed in two different coordinate frames each defined by a calibration entity.

Embodiment 9 is the method of embodiment 8, wherein the point-wise poses of the calibration entity comprise translational positions.

Embodiment 10 is the method of any one of embodiments 1-9, wherein each of the plurality of sensors is a camera or a laser tracker.

Embodiment 11 is the method of any one of embodiments 1-10, each of the plurality of calibration entities can be a sensor, a robot, and an object.

Embodiment 12 is the method of embodiment 11, wherein the object is a marker or a point-wise feature.

Embodiment 13 is the method of any one of embodiments 1-12, wherein each of the different coordinate frames defines a pose represented in the sensor data with respect to a reference coordinate frame.

Embodiment 14 is the method of embodiment 13, wherein the reference coordinate frame comprises a pre-determined coordinate frame in a workcell model.

Embodiment 15 is the method of any one of embodiments 1-14, wherein performing one or more optimization processes on the plurality of different constraint pairs comprises quantifying, for each constraint pair of the plurality of different constraint pairs, a local error between poses of a calibration entity observed in two different coordinate frames.

Embodiment 16 is the method of embodiment 15, wherein performing one or more optimization processes on the plurality of different constraint pairs further comprises quantifying a global error based on the local error quantified for each constraint pair of the plurality of different constraint pairs.

Embodiment 17 is the method of embodiment 16, wherein performing one or more optimization processes on the plurality of different constraint pairs further comprises minimizing the global error with one or more optimizers.

Embodiment 18 is the method of embodiment 15, wherein quantifying the local error between poses of the calibration entity observed in each of the plurality of different constraint pairs comprises quantifying the local error between poses of the calibration entity with respect to a reference coordinate frame.

Embodiment 19 is the method of any one of embodiments 1-18, wherein performing one or more optimization processes on the plurality of different constraint pairs comprises quantifying, for each constraint pair of the plurality of different constraint pairs, a local error between a measured relative pose and a computed relative pose of a first coordinate frame observed in a second coordinate frame, wherein the first coordinate frame is defined by a first calibration entity and the second coordinate frame is defined by a second calibration entity.

Embodiment 20 is the method of any one of embodiments 1-19, further comprising:

generating a second plurality of different constraint pairs using the updated model of the environment;

performing the one or more optimization processes on the second plurality of different constraint pairs to generate a second plurality of calibration values; and generating a second updated model of the environment using the second plurality of calibration values.

Embodiment 21 is a system comprising: one or more computers and one or more storage devices storing instructions that are operable, when executed by the one or more computers, to cause the one or more computers to perform the method of any one of embodiments 1 to 20.

Embodiment 22 is a computer storage medium encoded with a computer program, the program comprising instructions that are operable, when executed by data processing apparatus, to cause the data processing apparatus to perform the method of any one of embodiments 1 to 20.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
    obtaining an initial model of an environment comprising a plurality of calibration entities including a plurality of sensors and a plurality of robots, each of the plurality of sensors configured to observe movements by one or more calibration entities in the environment;
    executing a calibration program that generates movement data representing movements by the plurality of robots within the environment;
    generating sensor data representing how the sensors observe poses of calibration entities after the movements by the plurality of robots during execution of the calibration program;
    generating, from the sensor data, a plurality of different constraint pairs, wherein each of the plurality of different constraint pairs specifies a relationship between (i) a first observed pose of a calibration entity of the plurality of calibration entities with respect to a reference coordinate frame of the environment and (ii) a second observed pose of the calibration entity with respect to an entity coordinate frame defined by another calibration entity of the plurality of calibration entities;
    performing one or more optimization processes on the plurality of different constraint pairs to generate a plurality of calibration values by minimizing a global error derived from a respective local error corresponding to each of the plurality of different constraint pairs; and
    generating an updated model of the environment using the plurality of calibration values by causing movement of one or more of the plurality of calibration entities.

2. The method of claim 1, wherein each of the plurality of different constraint pairs comprises at least two different coordinate frames each defined by a calibration entity.

3. The method of claim 1, wherein each constraint pair of the plurality of different constraint pairs comprises at least a calibration entity to be observed in different coordinate frames.

4. The method of claim 1, wherein the plurality of different constraint pairs comprise a relative pose constraint that defines a relationship between a measured relative pose and a computed relative pose of a first coordinate frame observed in a second coordinate frame, wherein the first coordinate frame is defined by a first calibration entity and the second coordinate frame is defined by a second calibration entity.

5. The method of claim 4, wherein the measured relative pose and the computed relative pose of the first coordinate frame comprise both translational and rotational positions observable to the second coordinate frame.

6. The method of claim 1, wherein the plurality of different constraint pairs comprise a feature pose constraint that defines a relationship between feature poses of a calibration entity observed in two different coordinate frames each defined by a calibration entity.

7. The method of claim 6, wherein the feature poses of the calibration entity comprise both translational and rotational positions.

8. The method of claim 1, wherein the plurality of different constraint pairs comprise a feature point constraint that defines a relationship between point-wise poses of a calibration entity observed in two different coordinate frames each defined by a calibration entity.

9. The method of claim 8, wherein the point-wise poses of the calibration entity comprise translational positions.

10. The method of claim 1, wherein each of the plurality of sensors is a camera or a laser tracker.

11. The method of claim 1, each of the plurality of calibration entities can be a sensor, a robot, and an object.

12. The method of claim 11, wherein the object is a marker or a point-wise feature.

13. The method of claim 2, wherein one of the at least two different coordinate frames defines a pose represented in the sensor data with respect to a reference coordinate frame.

14. The method of claim 13, wherein the reference coordinate frame comprises a pre-determined coordinate frame defined for a workcell model.

15. The method of claim 1, wherein performing one or more optimization processes on the plurality of different constraint pairs comprises quantifying, for each constraint pair of the plurality of different constraint pairs, the respective local error between poses of a calibration entity observed in two different coordinate frames.

16. The method of claim 15, wherein performing one or more optimization processes on the plurality of different constraint pairs further comprises quantifying the global error based on the respective local error quantified for each constraint pair of the plurality of different constraint pairs.

17. The method of claim 16, wherein minimizing the global error comprises minimizing the global error with one or more optimizers.

18. The method of claim 15, wherein quantifying the respective local error between poses of the calibration entity observed in each of the plurality of different constraint pairs comprises quantifying the respective local error between poses of the calibration entity with respect to a reference coordinate frame.

19. The method of claim 1, wherein performing one or more optimization processes on the plurality of different constraint pairs comprises quantifying, for each constraint pair of the plurality of different constraint pairs, the respective local error between a measured relative pose and a computed relative pose of a first coordinate frame observed in a second coordinate frame, wherein the first coordinate frame is defined by a first calibration entity and the second coordinate frame is defined by a second calibration entity.

20. The method of claim 1, further comprising:
    generating a second plurality of different constraint pairs using the updated model of the environment;
    performing the one or more optimization processes on the second plurality of different constraint pairs to generate a second plurality of calibration values; and
    generating a second updated model of the environment using the second plurality of calibration values.

21. One or more computer-readable storage media storing instructions that when executed by one or more computers cause the one or more computers to perform respective operations, the respective operations comprising:
    obtaining an initial model of an environment comprising a plurality of calibration entities including a plurality of sensors and a plurality of robots, each of the plurality of sensors configured to observe movements by one or more calibration entities in the environment;
    executing a calibration program that generates movement data representing movements by the plurality of robots within the environment;

generating sensor data representing how the sensors observe poses of calibration entities after the movements by the plurality of robots, during execution of the calibration program;

generating, from the sensor data, a plurality of different constraint pairs, wherein each of the plurality of different constraint pairs specifies a relationship between (i) a first observed pose of a calibration entity of the plurality of calibration entities with respect to a reference coordinate frame of the environment and (ii) a second observed pose of the calibration entity with respect to an entity coordinate frame defined by another calibration entity of the plurality of calibration entities;

performing one or more optimization processes on the plurality of different constraint pairs to generate a plurality of calibration values by minimizing a global error derived from a respective local error corresponding to each of the plurality of different constraint pairs; and generating an updated model of the environment using the plurality of calibration values by causing movement of one or more of the plurality of calibration entities.

22. A system comprising one or more computers and one or more storage devices storing instructions that when executed by one or more computers cause the one or more computers to perform respective operations, the respective operations comprising:

obtaining an initial model of an environment comprising a plurality of calibration entities including a plurality of sensors and a plurality of robots, each of the plurality of sensors configured to observe movements by one or more calibration entities in the environment;

executing a calibration program that generates movement data representing movements by the plurality of robots within the environment;

generating sensor data representing how the sensors observe poses of calibration entities after the movements by the plurality of robots, during execution of the calibration program;

generating, from the sensor data, a plurality of different constraint pairs, wherein each of the plurality of different constraint pairs specifies a relationship between (i) a first observed pose of a calibration entity of the plurality of calibration entities with respect to a reference coordinate frame of the environment and (ii) a second observed pose of the calibration entity with respect to an entity coordinate frame defined by another calibration entity of the plurality of calibration entities;

performing one or more optimization processes on the plurality of different constraint pairs to generate a plurality of calibration values by minimizing a global error derived from a respective local error corresponding to each of the plurality of different constraint pairs; and generating an updated model of the environment using the plurality of calibration values by causing movement of one or more of the plurality of calibration entities.

* * * * *